INVENTOR.
FRANK P. BRILANDO,
STANLEY R. JAMESON & RUDOLPH G. BLAHO
BY
Horton, Davis, Brewer & Brugman
ATTORNEYS

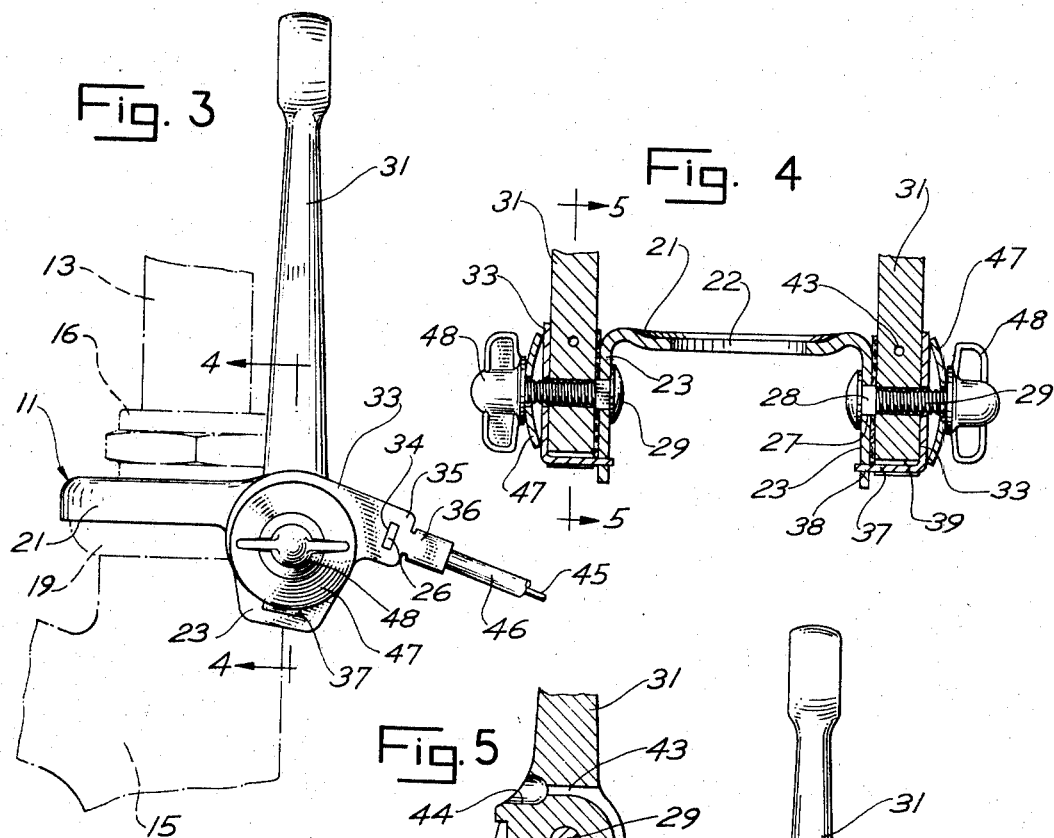

United States Patent Office 3,426,614
Patented Feb. 11, 1969

3,426,614
TWIN CONTROL LEVER ASSEMBLY
Frank P. Brilando, Niles, Stanley R. Jameson, Chicago, and Rudolph G. Blaho, Franklin Park, Ill., assignors to Schwinn Bicycle Company, a corporation of Illinois
Filed Jan. 9, 1967, Ser. No. 608,073
U.S. Cl. 74—501                        9 Claims
Int. Cl. F16c 1/10; G05g 11/00

ABSTRACT OF THE DISCLOSURE

Control lever assembly for mounting on the upper portion of the head set of a bicycle convenient to the handle bar.

BACKGROUND OF THE INVENTION

*Field of the invention*

This invention relates in general to bicycles and more particularly to levers operable manually by a rider to control an operating function thereof, such as gear or derailleur shifting, and specifically comprises a control lever assembly having a bracket mountable on the upper portion of the head set and inter-engaging a lever stop plate at two points spaced from each other about the pivotal axis of the lever, the bracket including a lateral extension for blockingly engaging an end of the casing of a flexible cable and supported at its outer end so as to resist bending from loads imposed by the cable casing in response to movements of the cable.

*Description of the prior art*

Such control levers heretofore customarily have been mounted by means of a clip type clamp or welded fitting on one of the frame elements of the bicycle, which is not the most convenient location for manual operation by the rider, and employ lever movement-limiting means prone to distortion and breakage in response to overly enthusiastic lever operation and are relatively expensive because requiring sub-assembly brazing of tapped bosses to the clamp.

SUMMARY OF THE INVENTION

The present invention comprises a control lever assembly having a bracket adapted to be mounted on the upper portion of the head set of a bicycle, so as to locate the lever directly adjacent the handle bar for most convenient manual operation by the rider, which bracket interengages with a lever stop plate at two points spaced from each other about the pivotal axis of the lever to provide a strong torque-resisting mounting for the stop plate, the bracket including a lateral extension for blockingly engaging an end of the casing of a flexible cable and supported at its outer end so as to resist bending from loads imposed by the cable casing in response to movements of the cable, with the bracket being apertured to receive the non-circular head portion of a lever-supporting carriage bolt to also minimize the cost of manufacture.

In the drawings:

FIG. 3 is an elevational view as seen from the right side of the unit;

FIG. 4 is a transverse sectional view through the pivotal axis of the levers and taken substantially on the line 4—4 of FIG. 3;

FIG. 5 is a longitudinal detail section through one of the levers, as seen on the line 5—5 of FIG. 4;

FIG. 6 is a top plan view; and

FIG. 7 is a vertical sectional view taken longitudinally through the center of the unit and the directly associated parts of the bicycle on which it is mounted.

DESCRIPTION OF THE PREFERRED EMBODIMENT

Figure 1:
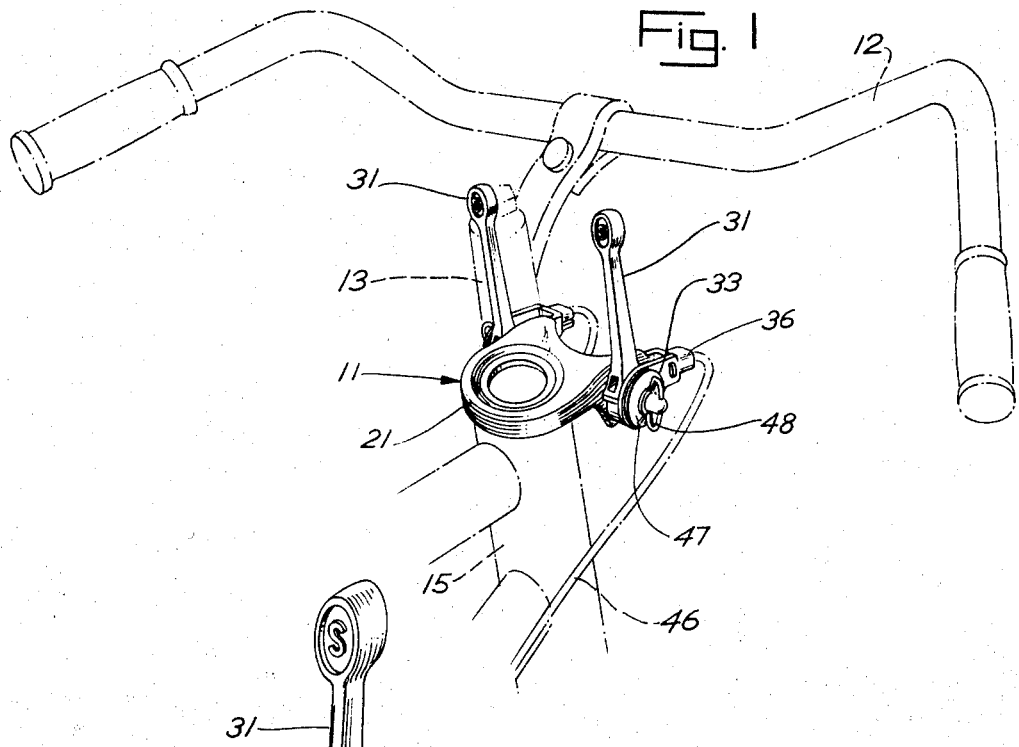
FIGURE 1 is a perspective view of a twin control lever assembly embodying the features of the invention, with parts of a bicycle shown in broken lines to illustrate the location of the unit thereon.

Referring more particularly to the drawings, the embodiment of the present invention therein illustrated comprises a twin control lever assembly, indicated generally by reference numeral 11, adapted to be mounted on a bicycle directly adjacent the handle bar, which is shown in FIG. 1 in broken lines at 12. As is customary, the handle bar 12 is supported by a stem 13 which, as best seen in FIG. 7, extends downwardly into the stem 14 of the front fork. This is mounted in well-known manner in the forward or head portion of the bicycle frame 15 by means of the usual head set which includes a head lock nut 16, an adjusting cone 17, a ball bearing race 18 and an upper head cup 19.

The control lever assembly 11 comprises a mounting bracket 21 having a central aperture 22 engageable over the upper end of the fork stem 14 and adapted to be secured to the upper portion of the head set by means of the lock nut 16 clampingly engaging the same against the adjusting cone 17. The standard head set customarily includes a lock washer interposed between the lock nut 16 and adjusting cone 17 which thus may be replaced by the mounting bracket 21. If the fork stem is of the type which includes an external keyway, the bracket 21 may be provided with a suitable tang or tab extending inwardly from its central aperture 22 for engagement therein.

Figure 2:
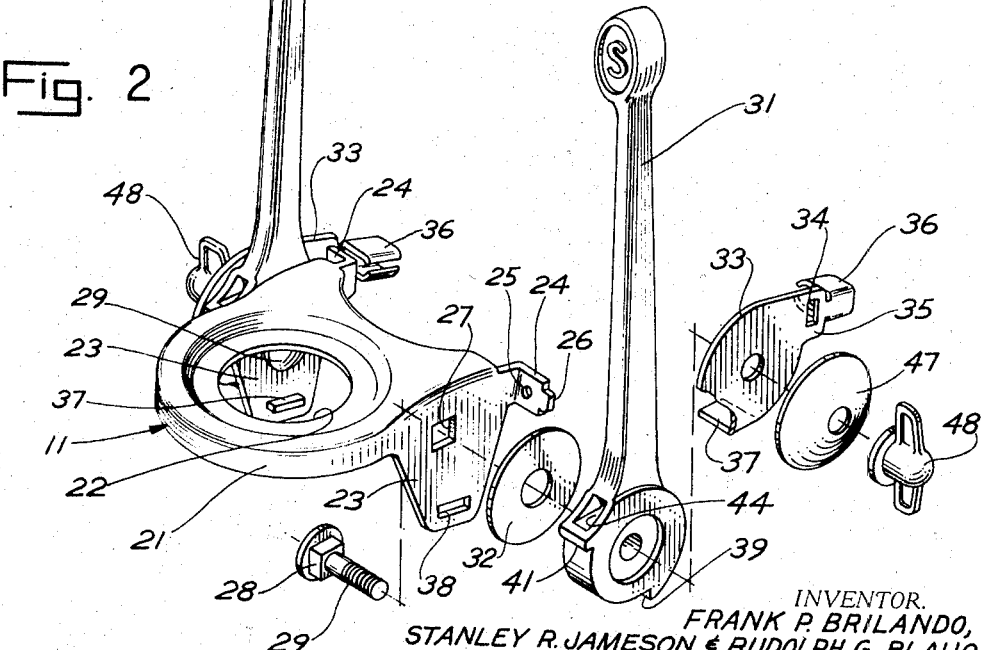
FIG. 2 is an enlarged perspective and partially exploded view of the unit of FIG. 1.

As best seen in the exploded view in FIG. 2, the main body portion of the mounting bracket 21 includes a pair of laterally opposed depending flanges 23, each of which terminates at its upper forward end in a lateral extension 24. This extension 24 is provided with a cable-guiding aperture 25, comprises a cable casing stop, and terminates in a reduced tab 26 for a purpose later to be described.

Each of the flanges 23 is provided with a non-circular aperture 27 to seat or receive the complementarily shaped non-circular portion 28 of the head of a carriage bolt 29. Each bolt 29 comprises shaft means pivotally supporting a control lever 31, and a fiber washer 32 preferably also is mounted on the bolt between the associated flange 23 and control lever 31. Mounted on each bolt 29 exteriorly of its associated control lever 31 is a lever stop and pressure plate 33 having a central aperture rotatably receiving the bolt and a rectangular aperture 34 in a forward extension 35 adapted to receive and cooperate with the tab 26 and lateral extension 24 of the associated mounting bracket flange 23. The forward extension 35 of each of the stop plates 33 is formed to provide a cable cover guide or clamping portion 36 extending inwardly therefrom. It will be appreciated that the control lever assembly 11 employs or incorporates two such lever stop plates 33, one for the right-hand lever 31 and the other for the left-hand lever 31. Each of these control lever stop plates 33 is formed with a bottom flange 37 extending inwardly therefrom in closely spaced relationship to the hub portion of the associated control lever 31. The inner end of each such flange 37 extends into a rectangular aperture 38 adjacent the bottom of the associated mounting bracket flange 23.

The hub portion of each control lever 31 peripherally is reduced for approximately 90° to clear the associated flange 37 and to form a lower stop shoulder 39 engageable with the forward edge of the flange 37 when the lever 31 is vertically upright and an upper radial stop or shoulder 41 which is adapted to engage the rear edge of the flange 37 to limit rearward pivotal movement of the control lever.

As best seen in FIG. 5, the hub portion of each control lever 41 also is provided with a peripheral groove 42 in its forwardly disposed surface which communicates with an aperture 43 at its upper end extending rearwardly through the lever and terminating at its rear end in an enlarged portion or counterbore 44. The latter is adapted to receive an enlarged portion or stop means formed on, or attached in well-known manner to, one end of the usual control cable 45 which, as best seen in FIG. 6, extends through the aperture 43 and the guide aperture 25 in the mounting bracket extension 24. The usual cover 46 for the control cable 45 (FIG. 3) is adapted to be clampingly engaged in well-known manner by the inwardly extending portion 36 of the associated stop plate 33 to secure the end of the cable cover against the forward surface of the mounting bracket extension 24 (FIG. 6).

Mounted on each of the carriage bolts or shaft means 29 outwardly of the associated control lever 31 is a dished tension washer 47 and a wing nut 48 for retaining the control lever and its associated parts on the mounting bracket and imparting the desired degree of frictional resistance to pivotal movements of the control lever on its supporting bolt. In this connection, it will be noted particularly from FIG. 4 that each control lever stop plate 33 has the added function of a pressure plate interposed between the control lever and the tension washer 47.

At the same time, the stop flange 37 disposed in the aperture 38 in the mounting bracket flange 23 comprises one inter-engaging means between the mounting bracket and the control lever stop plate, and the lateral extension 24 and tab 26 of the bracket engaging in the aperture 34 of the extension 35 of the stop plate 33 comprises a second inter-engaging means between these same parts which is spaced about the pivotal axis of the lever 31 from the first such inter-engaging means to provide a strong torque-resisting mounting for the stop plate which eliminates the problem of distortion and breakage in response to overly enthusiastic lever operation encountered with the devices of the prior art. And by comparison with the latter, the use of the carriage bolt 29 as a control lever mounting shaft greatly minimizes the cost of manufacture.

In addition to its function of interposing a limit upon the degree of pivotal movements of control lever 31 by its extension 37 being disposed in the path of movement of shoulders 39 and 41, the stop plate 33 acts as a ferrule for mounting the upper end of the cable by means of its clamping portion 36, and it has a most important function of providing an outboard support for the cable casing stop 24 in receiving the tab 26 of the latter in its companion aperture 34. But for this latter function, the cable casing stop 24 would be susceptible to ready distortion and breakage in response to overly enthusiastic rearward movement of control lever 31 from its vertical position. Also, the instant mounting bracket 21 enables mounting of the control assembly on the upper portion of the head set of the bicycle so as to locate the control unit 11 directly adjacent the handle bar 12 for most convenient manual operation by the rider of the bicycle. It will be appreciated that the same combination of elements may be adapted for use with a single control lever and supporting shaft means and, while the levers 31 herein illustrated are peculiarly adapted for performing gear changing or derailleur operating functions, they may be equally useful in connection with the control operation of other parts or functions.

It is thought that the invention and many of its attendant advantages will be understood from the foregoing description, and it will be apparent that many changes may be made in the form, construction and arrangement of the parts without departing from the spirit and scope of the invention or sacrificing all of its material advantages, the form hereinbefore described being merely a preferred embodiment thereof.

We claim:

1. A control lever assembly for bicycles, comprising a mounting bracket, a control lever, shaft means carried by said bracket for pivotally supporting said lever, a lever stop plate mounted on said shaft means on the opposite side of said lever from said bracket for limiting pivotal movement of said lever, and inter-engaging means formed on said bracket and said lever stop plate at two points spaced from each other about the axis of said shaft means to provide a torque-resisting mounting for said stop plate.

2. A control lever assembly according to claim 1, wherein said bracket comprises a main body portion apertured to receive the stem of a bicycle fork and to be secured to the upper portion of the usual head set by the lock nut forming a part thereof.

3. A control lever assembly according to claim 1 for operating a flexible cable secured to said control lever and having an enclosing casing, wherein said inter-engaging means comprises a lateral extension for blockingly engaging an end of said cable casing, said lateral extension being supported at its outer end so as to resist bending from loads imposed by said cable casing in response to movements of said cable by said control lever.

4. A control lever assembly according to claim 1, wherein said shaft means comprises a bolt having a non-circular head portion, and said mounting bracket includes a flange with a non-circular aperture for matingly receiving said head portion.

5. In a bicycle having a fork with a stem, a frame, and a head set for rotatably securing said stem in said frame, including an upper adjusting cone and a lock nut; a control lever assembly, comprising a mounting bracket having a main body portion apertured to fit over said stem to be secured thereto by said lock nut, control lever means, and shaft means carried by said bracket for pivotally supporting said control lever means.

6. A control lever assembly according to claim 5 wherein said shaft means comprises a carriage bolt having a non-circular head portion, and said mounting bracket includes a depending flange with a non-circular aperture to matingly receive said head portion.

7. In a control lever assembly according to claim 5, lever stop means for limiting pivotal movements of said control lever means, and inter-engaging means formed on said bracket and said lever stop means at two points spaced from each other about the axis of said shaft means.

8. A bicycle according to claim 7 including a flexible control cable secured to said control lever means and having an enclosing casing, wherein said inter-engaging means comprises a lateral extension on said bracket for blockingly engaging an end of said casing and supported at its outer end by said lever stop means to resist bending from loads imposed by said cable casing in response to movements of said cable by said control lever means.

9. A bicycle according to claim 7 having a control cable, wherein said control lever means is apertured to receive said control cable, and said inter-engaging means includes cable guide means formed integrally with said lever stop means

References Cited

UNITED STATES PATENTS 575,787   1/1897   Voitek _____ 280—279

(Other references on following page)

| | | | |
|---|---|---|---|
| 1,409,748 | 3/1922 | Meiselbach | 280—279 |
| 1,551,823 | 9/1925 | Guy | 74—501 |
| 1,850,348 | 3/1932 | Harley | 280—279 |
| 2,902,882 | 9/1959 | Schwinn | 74—489 X |
| 3,181,390 | 5/1965 | Juy. | |
| 3,181,391 | 5/1965 | Juy | 74—501 X |

FRED C. MATTERN, JR., *Primary Examiner.*

C. F. GREEN, *Assistant Examiner.*

U.S. Cl. X.R.

280—289; 74—487